June 21, 1966 G. W. TEW ETAL 3,256,673
TWIN BAG MAKING AND FILLING MACHINE
Filed May 21, 1963 4 Sheets-Sheet 2

INVENTORS
Gilbert W. Tew
James W. Howe, Jr.
BY
Bacon & Thomas
ATTORNEYS

INVENTORS
Gilbert W. Tew
James W. Howe, Jr.
BY
Bacon & Thomas
ATTORNEYS

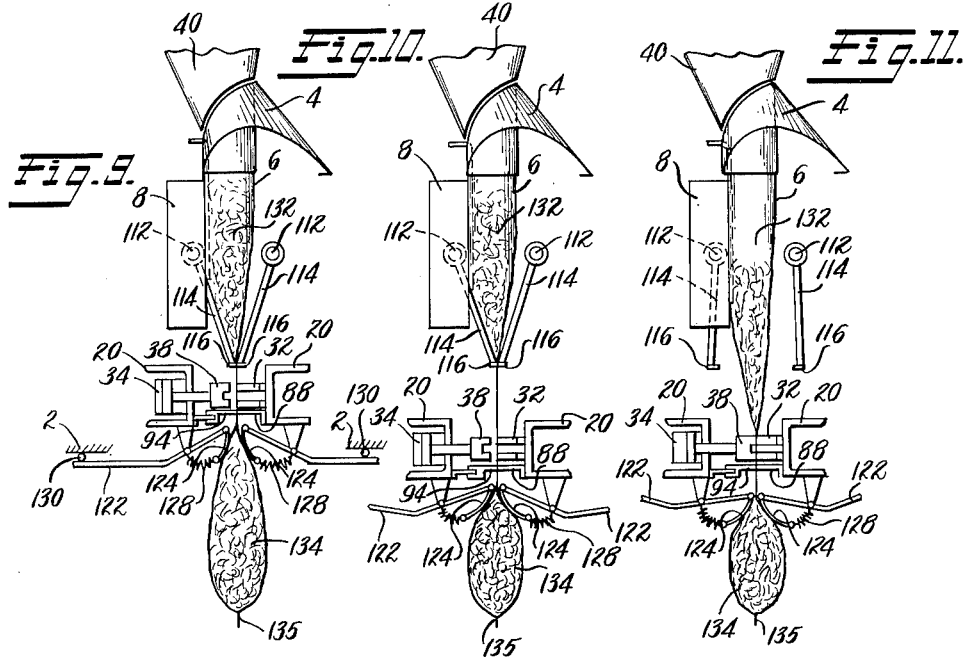
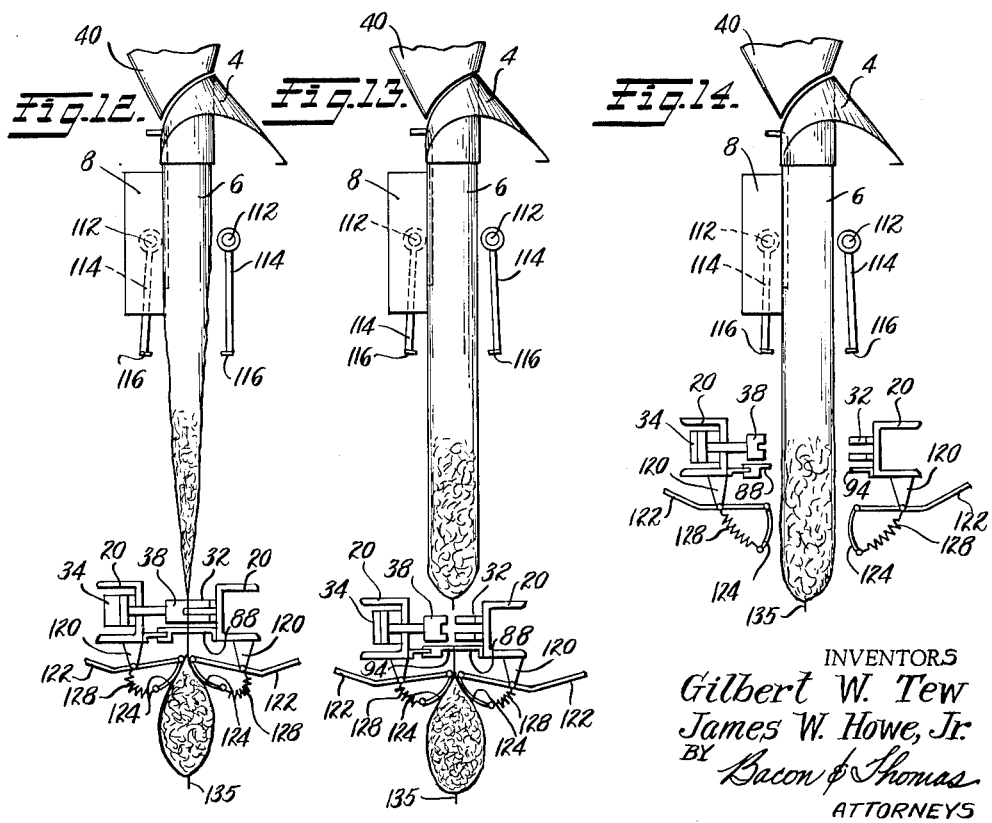

United States Patent Office 3,256,673
Patented June 21, 1966

1

3,256,673
TWIN BAG MAKING AND FILLING MACHINE
Gilbert W. Tew and James W. Howe, Jr., Durham, N.C., assignors to Sperry Rand Corporation, Wilmington, Del., a corporation of Delaware
Filed May 21, 1963, Ser. No. 281,904
7 Claims. (Cl. 53—182)

This invention relates to bag making, filling, and sealing machines of the type wherein a continuous web of bag forming material is directed through a former which forms it into a continuous tube having an open end, at the former.

The machine periodically deposits a weighed charge of material in the open end of the tube, the other end of which has been cross-sealed and severed. In such machines, sealing jaws are clamped against opposite sides of the tube to effect a cross-seal above a charge of material just deposited and move away from the former to draw another length of bag material therethrough. The present invention relates particularly to improvements in a machine of the above type and is directed to means for stripping portions of the deposited material away from the area to be sealed and for exhausting excess air from the filled bag portion before sealing.

In machines of the above type, difficulty has been encountered when packaging particular products such, for example, as potato chips or the like, which are quite light and bulky. When a charge of the material is dropped into the tube, the charge often extends upwardly with portions resting in the area to be cross-sealed. The sealing jaws would be ineffective to form an efficient and complete seal if the material were left in that region so it becomes necessary to compact it somewhat into the lower portion of the bag before sealing. According to the present invention, stripper means are carried by the jaws and are first brought into contact with the bag material to flatten the same and are then moved downwardly with the jaws to force the charge of material into the lower part of the bag before sealing. Upon performing such stripping function as described above, a considerable amount of air tends to be trapped in the bag with the product and causes the bag to billow outwardly. A further object of the invention is to provide deflating means operable in conjunction with the stripper to squeeze most of the air out of the filled bag portion of the tube before cross-sealing. A further aspect of the present invention resides in tube flattening and closing means operable on the tube of materal above the sealing jaws to flatten the bag material whereby to form a temporary closure capable of sustaining a charge of material thereabove while the jaws are being moved through a portion of their cycle and thereby facilitate faster operation of a machine of this type.

It is, therefore, an object of the invention to provide a novel stripping mechanism for stripping product from the region to be sealed in a continuous bag making, filling and sealing apparatus.

Another object is to provide a machine of the above type, including novel deflating means for exhausting excess air from a bag of product before sealing the same.

A still further object is to provide a machine of the type set forth, including a tube closing device operable to permit more rapid operation of the machine.

A further object is to provide a machine and improvements as set forth above which are simple in construction and economical to produce, yet reliable and efficient in operation.

Additional objects and advantages will become apparent to those skilled in the art as the description proceeds, with reference to the accompanying drawings wherein:

FIG. 7 is an enlarged fragmentary sectional view taken on the line 7—7 of FIG. 1;

FIG. 8 is an enlarged sectional view taken on the line 8—8 of FIG. 7;

Figure 15:
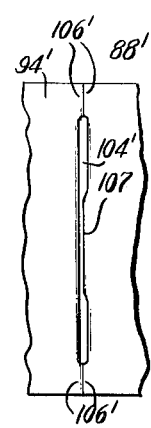

FIGS. 9 through 14, inclusive, are schematic illustrations showing the relationship of the major parts during different portions of a cycle of operations; and FIG. 15 is a fragmentary view similar to a portion of FIG. 7 but showing a modification of the stripper plates.

Figure 1:
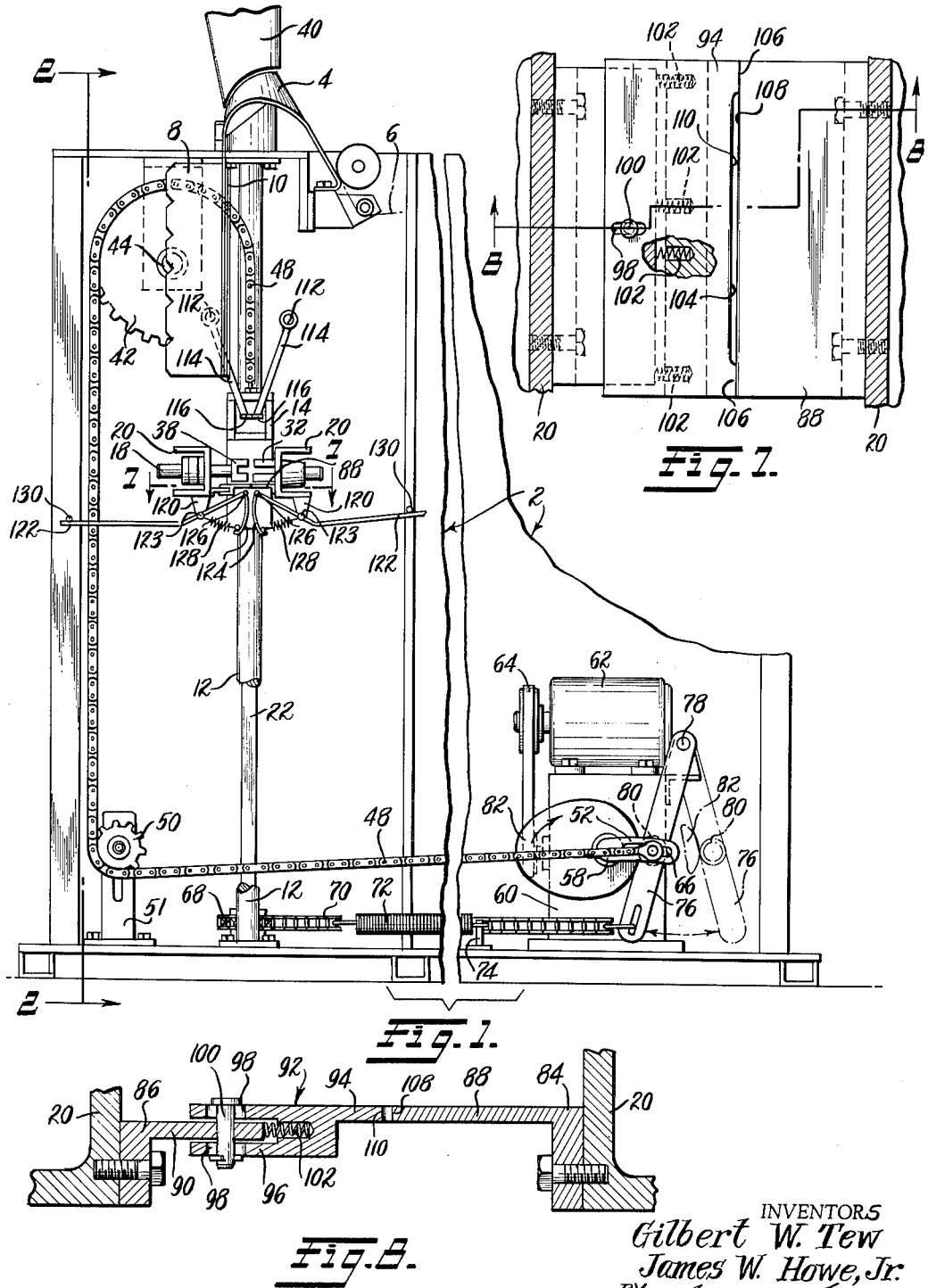
FIG. 1 is a somewhat schematic broken view of a machine embodying the improvements of the present invention, many parts being omitted for clarity of illustration.
Figure 2:
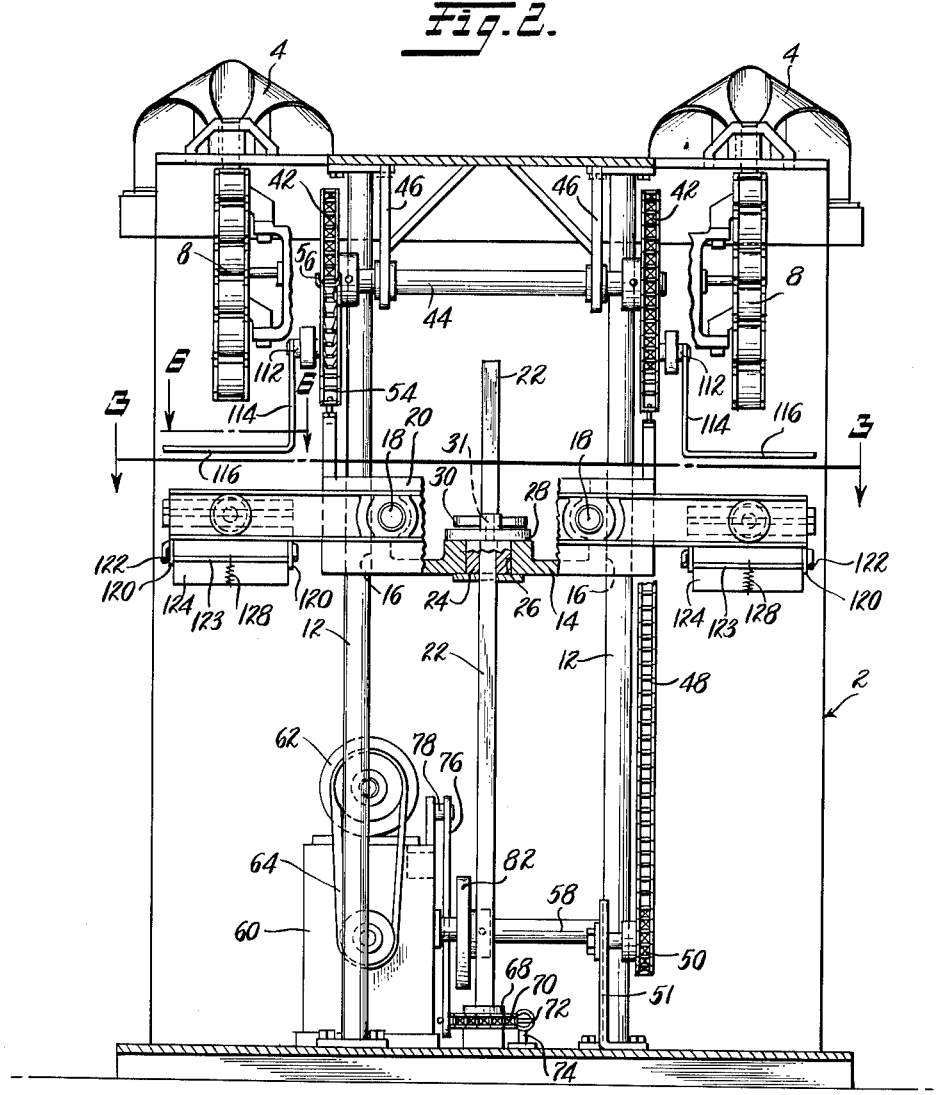
FIG. 2 is a vertical sectional view taken along the line 2—2 of FIG. 1.

Referring first to FIGS. 1 and 2, there is schematically shown a machine comprising a suitable frame structure 2 having mounted thereon a tube former 4. Actually, a pair of tube formers 4 are provided in laterally spaced relation, as shown in FIG. 2 and much of the mechanism to be described is duplicated on the machine whereby it forms, fills and seals two bags simultaneously. The description, however, will refer to only a single former and associated mechanisms, it being understood that the same are duplicated on the other side of the machine.

The tube former 4 is preferably of the type shown and described in the patent to Monsees et al., No. 2,940,408. A web 6 of bag forming material is directed from a suitable source over conventional guide means and through the tube former 4 to be formed thereby into a downwardly extending tubular shape. The machine also includes means 8 and 10 for sealing the longitudinally extending and overlapping edges of the web 6 to thus produce a longitudinally sealed tube open at its upper end, at the former 4. The longitudinal seam sealing means 8 and 10 are fully described and claimed in Patent No. 2,982,334 to Cooper et al. and no further description here is deemed necessary.

Figure 3:
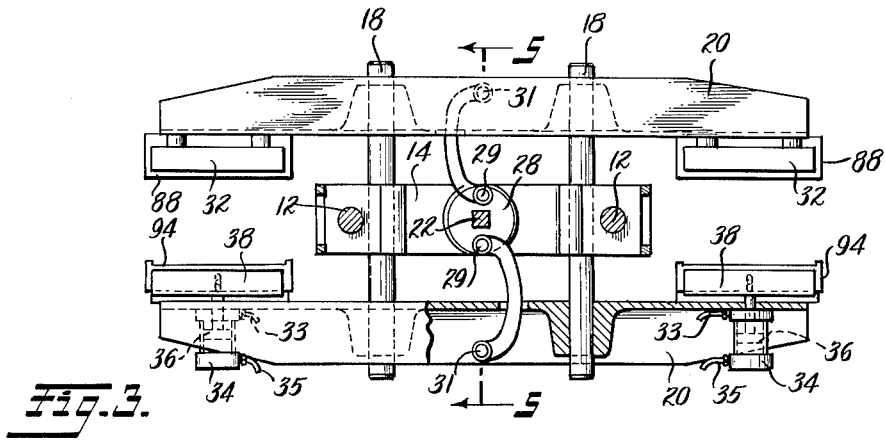
FIG. 3 is a horizontal sectional view taken along the line 3—3 of FIG. 2.
Figure 4:
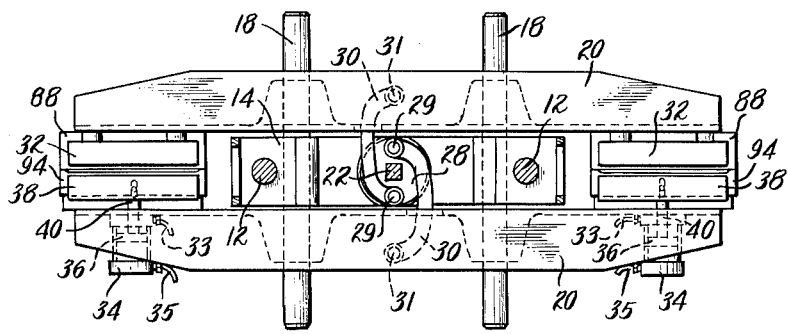
FIG. 4 is a sectional view similar to FIG. 3 but showing the parts in different relative positions.
Figure 5:
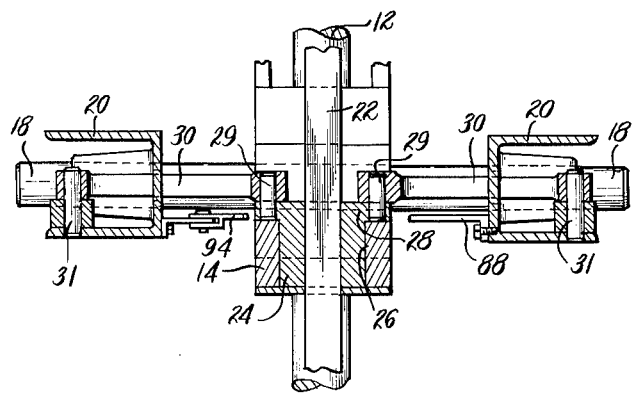
FIG. 5 is a sectional view on the line 5—5 of FIG. 3.

A pair of vertically extending guide rods 12 are fixed in spaced parallel relation to the frame 2 between the two tube formers 4. A slide 14 is provided with a pair of openings 16 slidably embracing the guide rods 12 whereby the slide 14 may be moved vertically along the guide rods. Referring to FIGS. 3 through 5 will show that the slide 14 is provided with a pair of transverse guide rods 18 fixed thereto and projecting from opposite sides thereof. The guide rods 18 slidably support and guide a pair of beams 20 for horizontal sliding movement toward and from each other. A vertical noncircular shaft 22 is journalled on the machine frame at the lower part thereof and extends upwardly midway between the guide rods 12 and through the slide 14. The noncircular shaft 22 carries a bearing member 24 journalled in an opening 26 in the slide 14 and is nonrotatably slidable through a disc 28, which is rotatably mounted on the slide 14, preferably by being formed integral with bearing member 24. By referring to FIGS. 3 and 4, it will be seen that the disc 28 is pivoted at 29 to adjacent ends of a pair of oppositely facing C-shaped links 30, each being pivoted to the disc at diametrically opposite points eccentric to the center of shaft 22. The other ends of the links 30 are respectively pivoted, at 31, to the beams 20, as clearly shown. As illustrated in FIGS. 3 and 4, rotation of the disc 28 to one position causes the beams 20 to move apart to the outer limit of their intended movement whereas rotation of the disc 28 to a second position draws the beams together, as shown in FIG. 4.

One of the beams 20 carries a pair of fixed jaws 32, which constitute cross-sealing jaws for the tubular bag material. The other beam 20 is provided with cylinders 34 in which pistons 36 are slidable. A pair of sealing jaws 38 are secured to the projecting piston rods 40 to be moved in response to actuation of the pistons 36 by pneumatic pressure or other suitable operating fluid directed to cylinders 34 through conduits 33 or 35 leading to respectively opposite sides of pistons 36. The parts are so proportioned that when the disc 28 is rotated to a position to draw the beams 20 to their innermost position (FIG. 4), the jaws 32 and 38 remain in spaced relation, with the pistons 36 retracted in their cylinders 34. Upon subsequent admission of pressure to the cylinders 34 through conduits 35, the pistons 36 are forced outwardly, thus projecting the jaws 38 into clamping relation with the jaws 32. As is conventional, the jaws 32 and 38 are preferably of the heated type whereby they clamp the bag material therebetween and effect a transverse heat seal.

The slide 14 and the means carried thereby are of sufficient weight so that when released, they will slide downwardly along the rods 12 with sufficient force to draw the bag material 6 through formers 4 to draw another length of bag material through the apparatus. A suitable funnel or equivalent 40 is arranged to direct a weighed charge of material into the open upper end of the formed tube at the former 4, in the manner more fully described in Patent No. 2,953,882 to Tew.

To effect cyclic raising and release of the slide 14, the machine is provided with a pair of spaced sprocket wheels 42 respectively positioned near the guide rods 12 and secured to a shaft 44 journalled in brackets 46 carried by the machine frame 2. The sprocket wheels 42 are arranged so that a vertical tangent from one edge thereof passes through the projected area of the slide 14 closely adjacent the nearest guide rod 12. A sprocket chain 48 is secured at one end to the slide 14, is trained over a sprocket wheel 42 and extends downwardly therefrom over an idler sprocket 50 adjustably mounted on a frame bracket 51 and has its other end secured to a crank arm 52. A second sprocket chain 54 is likewise secured at one end to the slide 14, then trained upwardly and over the other sprocket wheel 42 and is secured at its outer end to the periphery of the sprocket wheel over which it is trained, as at 56. Thus, the sprocket wheels 42 are enforced to rotate in unison and to exert equal lifting forces on the slide 14 at spaced points adjacent the respective guide rods 12.

The crank arm 52 is carried by a shaft 58 extending from a gear box or the like 60. The shaft 58 constitutes an output shaft from the drive means which includes not only the gear box 60 but a motor 62 and a suitable belt drive 64 from the motor to the gear box. As is obvious, rotation of the shaft 58 will cause the crank arm 52 to rotate therewith and cyclically lift the slide 14 and then release the same for rate-controlled downward movement along the guide rods 12 under the influence of gravity. As shown, the crank arm 52 is provided with a longitudinal slot 66, along which the point of securement of the chain 48 can be adjustably fixed whereby to vary the range of vertical movement of the slide 14 and thus adjust the apparatus for forming bags of different predetermined lengths.

The noncircular shaft 22, previously described, has fixed adjacent its lower end a sprocket wheel 68 over which a sprocket chain 70 is trained. One end of the sprocket chain 70 is secured to one end of a tension spring 72, the other end of which is secured to a fixed bracket 74 on the machine frame. From the spring 72 the chain 70 is trained over sprocket wheel 68 and thence rearwardly to a position where it is secured to the lower end of a lever 76, pivoted at 78 to a fixed bracket on the gear box 60. An intermediate portion of the lever 76 carries a cam follower roller 80 which normally bears against the periphery of a cam 82 fixed to the shaft 58. The cam 82 is provided with a lobe of suitable shape so that each revolution of the shaft 58 causes the lever 76 to swing and actuate chain 70, sprocket 68, and noncircular shaft 22, whereby the latter is caused to oscillate through substantially 180° to effect rotation of the disc 28 and sliding movement of the beams 20 in the manner described. Obviously, the timed relation of rotation of shaft 22 and vertical movements of the slide 14 may be predetermined and/or adjusted as desired by adjusting the angular position of either cam 80 or crank 52, or both, on shaft 58.

Referring now to FIGS. 7 and 8, the beams 20 are shown as provided with L-shaped members 84 and 86, respectively secured thereto. The member 84 includes a horizontal plate portion 88 which projects inwardly from the beam 20 closely below the associated fixed jaw 32, a distance slightly greater than the horizontal dimension of that jaw (see FIG. 1). The L-shaped member 86 is provided with a horizontal plate portion 90 displaced somewhat below the plane of the plate 88. The plate portion 90 constitutes a guide for a stripper plate member 92 having a stripper plate 94 coplanar with the plate 88. The member 92 has a lower plate portion 96 extending below the horizontal plate 90 and the upper plate 94 and lower plate 96 are provided with aligned elongated slots 98 through which a pin 100 slidably extends. The pin 100 is fixed to the horizontal plate 90 and constitutes stop means limiting the extent of sliding movement of the member 92 along the plate 90. A plurality of compression springs 102 are arranged between the member 92 and the plate 90 to urge the member 92 to the right, as seen in FIGS. 7 and 8, to project the outermost edge of plate 94 toward plate 88. The plates 94 and 88 constitute stripper plates, the operation of which will be more fully described. The pin 100 constitutes stop means limiting the movement of member 92 toward plate 88 under the influence of springs 102 and is so arranged that the outermost edge of plate 94 normally projects farther to the right than the corresponding edge face of movable jaw 38 when the latter is in its retracted position. As seen in FIG. 7, the plate 94 is provided with a cutaway portion 104 between the ends of its outer edge and the bottom of the cutaway portion defines a substantially straight edge itself. Thus, the plate is in effect provided with a pair of spaced projections 106 constituting spacer means for predetermining and limiting the extent of approach of the edge 108 of plate 88 and the edge 110 of plate 94. Preferably, the projections 106 are spaced apart a distance greater than the width of the flattened tube from which the bags are formed. As is obvious, when the beams 20 are moved toward each other by the shaft 22, the jaws 32 and 38 are brought to a position adjacent each other but still somewhat spaced apart. However, the plates 94 and 88 are brought into engagement, as shown in FIG. 7, and they thereby flatten the tube of bag material in the cutout portion 104, with the projections 106 lying outwardly of the edges of the flattened bag. The depth of the cutout 104 is such that the tubular material is flattened but not clamped therein, there being some slight excess of space in the cutout. The purpose and operation of this feature will be more fully described later.

Figure 6:
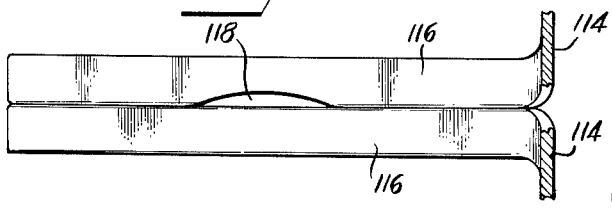
FIG. 6 is an enlarged sectional view of the tube closers taken on the line 6—6 of FIG. 2.

The machine frame 2 also rotatably supports a pair of horizontal spaced shafts 112 adjacent the tube formers 4 and above the slide 14. Each shaft 112 has fixed thereto a generally downwardly extending arm 114 to the lower end of which a laterally projecting tube closure blade or rod 116 is fixed (see also FIG. 6). The shafts 112 are cyclically oscillated in timed relation to vertical movements of the slide 14 by means not shown herein but which will be obvious to one skilled in the art. The timing of operation of the tube closure blades 116 will be further described. A pair of the arms 114 and blades 116 is provided below each of the tube formers 4 and so arranged that the blades 116 are on opposite sides of the tube formed by the formers and extend transversely thereacross. As shown in FIG. 6, one of the blades 116 is provided with a cutout 118 whereby a portion of the edge of that blade is spaced from the adjacent edge of the other blade, for a purpose that will be more fully described later. As shown in FIGS. 1 and 2, the beams 20 carry depending brackets 120 at the lower ends of which are pivoted rods 122 on axes 123. The rods 122 extend inwardly and upwardly from their pivotal mounting on the brackets 120 and at their inner ends extend transversely on opposite sides of the tubular bag material. The transversely extending portions of the rods 122 pivotally support curved plate members 124, which are pivotally mounted to the rods 122 at their upper edges. As shown, the plates 124 are transversely curved about an axis of curvature parallel to the pivots 126 by which they are mounted on the rods 122. The lower edges of the plates 124 are freely swingable toward and from each other under the control of spring means 128. Each of the springs 128 is a light compression spring having spaced convolutions whereby it may be readliy bent laterally. One end of each spring is fixed relative to its rod 122 whereas the other end is secured to a midportion of its associated plate 124. Thus, the springs 128 urge the plates 124 to swing inwardly toward each other with a relatively light pressure. As shown, the rods 122 extend outwardly from their pivotal support on brackets 120 and project to positions adjacent abutments 130 on the frame 2. The abutments 130 are so positioned that when the beams 20 are moved to their uppermost positions, the rods 122 engage abutments 130 and forceably swing the inner ends of the rods and plates 124 in a generally upward and outward direction so that the upper edges of the plates 124 are closely adjacent the bottom surfaces of the stripper plates 94 and 88 and somewhat spaced apart. As the slide 14 and beams 20 move downwardly, as will be described, the rods 122 are carried away from abutments 130 and released to the action of gravity. The parts are so proportioned that the plates 124 and those portions of rods 122 inwardly of brackets 120 weigh more than the parts outwardly of the brackets so that gravity tends to cause the rods to swing about their pivotal supports in a direction to project the plates 124 inwardly and downwardly toward each other.

Referring now to FIGS 9 through 14, there is shown therein a preferred sequence of operations. FIG. 9 shows the tube closer blades 116 in their closed position to hold the bag material 6 flattened at a point above the jaws 32 and 38 and a charge of product 132 has just been deposited through the former 4 but is being supported by the blades 116. A previously deposited charge of product 134 lies in the bottom of the tube and against cross seal 135. The beams 20 have just been moved to their innermost positions (shown in FIG. 4) by operation of cam 82, and stripper plates 88 and 94 have been brought into abutting engagement as shown in FIGS. 7 and 8, above the uppermost part of charge 134, while jaws 32 and 38 remain slightly separated. The previous charge of product 134, in the lower part of the tube, is very loosely contained and extends upwardly into a region intended to be cross-sealed. As the beams 20 were moved toward each other, the plates 124 engaged the sides of the filled bag portion and were swung slightly outwardly to the position shown in FIG. 9, thus slightly stressing the springs 128. With the parts in this position, the beams are moved downwardly a short predetermined distance to the position shown in FIG. 10 and while the jaws 32 and 38 remain separated. During this operation the flattened bag material 6 extends through the clearance space 104 (see FIG. 7) but is not clamped therein, being freely slidable therethrough. Downward movement of the beams 20 has also released arms 122 from abutments 130 so that gravity tends to swing the arms 122 to the position shown in FIG. 10 and springs 128 cause the plates 124 to exert a light inward pressure against the bag. At the same time the stripper plates 94 and 88 in moving downwardly force the product 134 into a more compact condition and strip all fragments of product from within the tube in the region thus stripped. As seen in FIG. 10, the beams 20 have moved downwardly a sufficient distance to strip all product from a zone now between the sealing jaws 32 and 38. During the stripping of the product, as described, the plates 124 apply a constant light pressure to the bag and thus expell excess air therein upwardly between the stripper plates. As previously described, the tube closer blades 116 are formed to provide a clearance space 118 therebetween. Even though those blades are closed and tightly clamped against the sides of the tube in FIG. 10, the stripping action just described for expulsion of air from the bag is not hindered by blades 116 since the space 118 defines a vent through which expelled air may freely pass even though that vent space is not large enough to permit any of the upper charge 132 to fall therethrough.

After the bags have been stripped, as shown in FIG. 10, pressure fluid is admitted to the cylinders 34 through conduits 35 to project movable jaws 38 toward fixed jaws 32 into firm clamping relation with the flattened bag material and heat sealing immediately commences. At about this same time the closer blades 116 are opened to the position of FIG. 11, thus permitting the upper charge 132 to drop downwardly and rest on the portion of the bag held closed and flattened by the jaws 32 and 38. The beams 20 now begin to move downwardly by virtue of operation of crank 52 and since the jaws 32 and 38 are clamped to the bag material, the latter is drawn through the tube former 4 to form another length of bag material into tubular shape. The "throw" of crank 52 is so adjusted that downward movement of the beams 20 to the lowermost position shown in FIG. 12 draws just enough material through the former for one more bag. When the beams 20 reach the lowermost position of FIG. 12, means (not shown) associated with the jaws 32 and 38 are operated to sever the filled and compacted bag from the remainder of the tube in a region midway between the upper and lower edges of the cross-seal. Such severing means are shown and described in the patent to Tew 2,953,882, previously referred to. Immediately thereafter fluid is admitted to the cylinders 34 through conduits 33 to retract movable jaws 38 to the position of FIG. 13 and immediately thereafter the beams 20 are moved apart to their outermost positions of FIG. 3, by operation of the cam 82 and shaft 22. After the beams have thus been separated, they start to move upwardly to return to the position of FIG. 9, such upward movement being effected by the crank 52 which operates in timed relation to the cam 82.

FIG. 14 illustrates the conditions while the beams 20 are still moving upwardly. Just about the time the beams 20 reach their uppermost position of FIG. 9, the shafts 112 are oscillated to close the bag closer blades 116 to the position of FIG. 9 and the next charge of material is immediately thereupon dropped through the former 4 into the tube to be supported by blades 116, as also shown in FIG. 9. During the time of deposit of the upper charge 132, the beams 20 are moved inwardly to the position of FIG. 9 and the stripping function, completed in FIG. 10, is performed and the entire cycle already described is repeated. It is to be noted that, by the use of the tube closers 116 in the manner described, it is not necessary to wait until the sealing jaws have closed upon the bag (FIG. 11) before depositing the next charge of material. By depositing the charge 132 through the former during that portion of the cycle shown in FIGS. 9 and 10 saves considerable time and a complete cycle of operation can be completed in less time than heretofore possible and the throughput of the machine is thus considerably increased.

It is to be understood that the means for effecting properly timed operation of the various instrumentalities described may take any suitable form obvious to a skilled mechanic and need not be described here. However, it may be pointed out that controlling means suitable for effecting the timing of operation of fluid motors, such as control valves (not shown) for the cylinders 34 and pistons 36, and oscillation of such means as the shafts 112 carrying the tube closer blades 116 are shown and described in the patent to Tew 2,953,882 and such means may readily be adapted to the environment of the present machine.

FIGS. 7 and 8 show a specific form of stripper plate whereas FIG. 15 illustrates a modification thereof. In FIG. 15, both stripper plates 88′ and 94′ are provided with cutouts defining a clearance space 104′ and each plate is provided with a projection 106′ serving together as the spacer means already described. In this modification, however, one of the plates, for example, plate 88′, is provided with a further projecting portion 107 which projects toward the adjacent edge of the plate 94′, a distance less than the width of the clearance space 104′. Thus, the projection 107 insures more efficient stripping action while the enlarged spaces at each side thereof insure adequate venting of air expelled from the filled bag by the stripping action and by plates 124, as already described.

While a single specific embodiment of the invention has been shown and described herein, it is to be understood that the same is merely illustrative of the principles involved and that other forms may be resorted to within the scope of the appended claims.

We claim:

1. In a machine of the type described, having a frame, means for forming an open-ended tube of bagging material, cyclically depositing charges of material through said open end and cross-sealing said tube between charges, the improvement comprising: sealing jaws on opposite sides of said tube and being movable toward each other and longitudinally of said tube; stripper means movable with each jaw, said stripper means having adjacent edge portions normally closer to each other than the adjacent portions of said jaws and spaced therefrom in a direction away from the open end of said tube; at least one of said stripper means being resiliently mounted for yieldable movement relative to its associated jaw in a direction away from the other stripper means; said adjacent edge portions extending transversely of said tube and having spacer means mutually engageable outwardly of said tube for holding said edge portions in spaced relation by a predetermined amount; and means for moving said jaws and stripper means toward each other to engage said spacer means while said jaws remain spaced apart, moving said jaws and stripper means along said tube away from said open end and then moving said jaws together to cross-seal said tube in a region traversed by said adjacent edge portions.

2. A machine as defined in claim 1 wherein said stripper means comprise substantially coplanar plates, one of said plates being fixed relative to its associated jaw and the other being mounted for sliding movement toward and from said one plate; stop means limiting movement of said other plate toward said one plate; and spring means normally holding said other plate against said stop means.

3. A machine as defined in claim 1 wherein said stripper means comprise substantially coplanar plates, the ends of at least one of said edge portions extending toward the other edge portion a short distance and constituting said spacer means.

4. A machine as defined in claim 3 wherein an intermediate length of one of said edge portions, between said spacer means extends toward the other edge portion more than the remainder thereof but a distance less than said predetermined amount.

5. In a machine of the type described having a frame, means for forming an open-ended tube of bagging material, cyclically depositing charges of material through said open end and cross-sealing said tube between charges, the improvement comprising: sealing jaws on opposite sides of said tube and being movable toward each other and longitudinally of said tube; stripper means movable with each jaw, said stripper means having adjacent edge portions normally closer to each other than the adjacent portions of said jaws and spaced therefrom in a direction away from the open end of said tube; bag deflating means movable with said jaws and comprising a pair of transversely extending plates pivoted at one edge thereof on parallel pivot axes on opposite sides of said tube and extending generally parallel to said jaws on the side thereof remote from said open end; said plates being convexly bowed toward each other about an axis of curvature parallel to their pivotal axes; spring means engaging the free edges of said plates and urging said plates to swing toward each other about their pivot axes, said pivot axes being fixed on the ends of arms which are in turn pivoted on support axes fixed relative to said jaws; said stripper means being between said deflating means and said jaws; said pivot axes being adjacent opposite sides of said tube and said support axes being outwardly thereof; and means on said arms outwardly of said support axes and engageable with portions of said frame upon movement of said jaws toward said open end to swing said pivot axes toward said stripper means and away from said tube; said arms and deflating plates being gravity biased to swing away from said stripper means and toward said tube.

6. In a machine of the type described having a frame, means for forming an open-ended tube of bagging material, cyclically depositing charges of material through said open end and cross-sealing said tube between charges, the improvement comprising: sealing jaws on opposite sides of said tube and being movable toward each other and longitudinally of said tube; stripper means movable with each jaw, said stripper means having adjacent edge portions normally closer to each other than the adjacent portions of said jaws and spaced therefrom in a direction away from the open end of said tube; tube closing means movably mounted on said frame and comprising a pair of transverse arms on opposite sides of said tube and movable toward each other to flatten and clamp said tube between adjacent edge portions thereof; said tube closing means being between said open end and said jaws; at least one of said adjacent edge portions of said closing means having a portion spaced from the other edge portion to define an air vent to permit exhausting air from said tube in response to stripping movement of said stripper means and while said transverse arms hold said tube clamped therebetween.

7. A machine as defined in claim 6 wherein each of said transverse arms extend laterally from one end of a swinging arm having its other end pivoted to said frame on a fixed axis adjacent said open end.

References Cited by the Examiner

UNITED STATES PATENTS 3,027,695   4/1962   Leasure _____ 53—182 X

TRAVIS S. McGEHEE, *Primary Examiner.*

FRANK E. BAILEY, *Examiner.*

S. ABEND, *Assistant Examiner.*